(12) United States Patent
Oshita et al.

(10) Patent No.: US 7,234,286 B2
(45) Date of Patent: Jun. 26, 2007

(54) METHOD AND SYSTEM FOR MANUFACTURING A PACKAGE

(75) Inventors: Kazumichi Oshita, Hiroshima (JP); Kenji Shinbutsu, Hiroshima (JP); Yoichi Tominaga, Hiroshima (JP)

(73) Assignee: Ajinihon K.K., Hiroshima (JP)

( * ) Notice: Subject to any disclaimer, the term of this patent is extended or adjusted under 35 U.S.C. 154(b) by 0 days.

(21) Appl. No.: 11/204,704

(22) Filed: Aug. 16, 2005

(65) Prior Publication Data

US 2006/0137298 A1 Jun. 29, 2006

(30) Foreign Application Priority Data

Dec. 27, 2004 (JP) ............... 2004-375420

(51) Int. Cl.
  *B65B 9/06* (2006.01)
  *B65B 61/18* (2006.01)
(52) U.S. Cl. ............... 53/412; 53/450; 53/455; 53/133.8; 53/553; 53/562
(58) Field of Classification Search ............... 53/133.8; 493/237
See application file for complete search history.

(56) References Cited

U.S. PATENT DOCUMENTS

| | | | | |
|---|---|---|---|---|
| 2,180,966 A | * | 11/1939 | Salfisberg | 53/450 |
| 2,539,755 A | * | 1/1951 | Rogers et al. | 493/335 |
| 3,212,381 A | * | 10/1965 | Heyer | 83/308 |
| 3,642,126 A | * | 2/1972 | Kurtz et al. | 206/63.3 |
| 3,929,047 A | * | 12/1975 | Brandl | 83/499 |
| 4,147,583 A | * | 4/1979 | Deutschlander | 156/510 |
| 4,254,601 A | * | 3/1981 | Prager et al. | 53/133.8 |
| 4,586,312 A | * | 5/1986 | Limousin | 53/412 |
| 4,919,272 A | * | 4/1990 | Kai et al. | 383/200 |
| 4,999,968 A | * | 3/1991 | Davis | 53/133.1 |
| 5,067,306 A | * | 11/1991 | Umezawa | 53/412 |
| 6,343,876 B2 | * | 2/2002 | Takahashi et al. | 383/200 |

FOREIGN PATENT DOCUMENTS

| | | |
|---|---|---|
| JP | 03-014406 | 1/1991 |
| JP | 03-032598 | 2/1991 |
| JP | 06-008966 | 1/1994 |

* cited by examiner

*Primary Examiner*—John Sipos
(74) *Attorney, Agent, or Firm*—Marshall, Gerstein & Borun LLP (57) ABSTRACT

A method and system for manufacturing a package include: a package-joining belt forming step for forming a package-joining belt (PC) in which packages (P) each containing a material filled in between superposed films and each sealed by joint portions (PA) and a side edge portion (PF) are joined with each other by the joint portions (PA), the package-joining belt forming step including: a superposing process of forming superposed films; a joint portion forming process of forming band-shaped joint portions (PA); a side edge portion forming process of forming band-shaped side edge portion (PF); and a filling process of filling the material; and a scar forming step for forming plural elongate scars (100) each extending adjacent and substantially perpendicularly to the side edge in the side edge portion (PF), wherein the package-joining belt forming step and the scar forming step are carried out, while the package-joining belt is drawn.

4 Claims, 6 Drawing Sheets

METHOD AND SYSTEM FOR MANUFACTURING A PACKAGE

BACKGROUND OF THE INVENTION

1. Field of the Invention

The present invention relates to a method and system for manufacturing a package. More particularly, the invention relates to a method and system for manufacturing a package each having a band-like side edge portion formed by joining films together.

2. Description of the Related Art

A package of the type shaped like a pouch by superposing films one upon another and then joining their respective edge portions together (hereinafter will be referred to as package) has been widely used as a package for containing a filling material comprising ingredients of an instant food, or powder or liquid such as a seasoning.

In general, a packaging machine is configured to manufacture such packages as follows. Initially, one belt-shaped film is folded widthwise to have superposed film portions, or two belt-shaped films are superposed upon each other (superposing process).

Subsequently, the superposed film portions or superposed films are joined together over the entire width thereof at predetermined intervals in the longitudinal direction to form band-shaped joint portions (joint portion forming process). In the case where one belt-shaped film is folded widthwise, the region defined between adjacent joint portions thus formed forms a pouch having an opening along a side edge of the film. On the other hand, in the case where two belt-shaped films are superposed upon each other, the superposed films are joined together along one side edge thereof to form a band-shaped side edge portion (side edge portion forming process) and the region defined by the band-shaped side edge portion and adjacent joint portions forms a pouch portion having an opening along one side edge thereof. Such a packaging machine as the so-called vertical type packaging machine is configured to form pouch portions each having opening along one joint portion. Specifically, at least one side edge of superposed films is subjected to the side edge portion forming process while the lower one of longitudinally adjacent joint portions of the films subjected to the joint portion forming process, whereby pouch portions are formed each having the longitudinally upper joint portion opened.

In turn, a filling material to be contained in each of the packages is filled into the region defined by adjacent joint portions and the side edge portion from the opening (filling process).

Subsequently, the opening is closed by the side edge portion forming process or the joint portion forming process. In this way, packages each sealed at joint portions and side edge portion thereof are completed which contain the filling material having been filled in between the superposed films, while at the same time the packages thus completed form a package-joining belt comprising such packages joined with each other by such joint portions (package-joining belt forming step).

As required, the package-joining belt is processed in accordance with its uses. For example, it is possible that each package is individually cut off from the package-joining belt, or that package-joining belt is folded or taken up into a roll.

An easy-to-open package has been proposed which has a peripheral edge portion formed with plural elongate scars extending adjacent and substantially perpendicularly to an edge of the peripheral edge portion in a staggered arrangement for rendering the sealed package easy to open (see Japanese Patent Publication No. 2731474 for example). This easy-to-open package has been realized by forming scars on a film prior to packaging (see Japanese Patent Publication No. 2731474 noted above and Japanese Patent Laid-Open Publications Nos. HEI 3-14406 and HEI 3-32598 for example). A method of forming such scars is disclosed wherein: a processing roller comprising a metal roller and plural cutting edges formed on the periphery of the metal roller is disposed as opposed to a press roller; and the processing roller and the press roller rotate in opposite directions at equal peripheral speed while contacting each other at one point through which a film is caused to pass (see FIGS. 8 and 10 of the aforementioned Japanese Patent Publication No. 2731474).

However, before putting a film formed with scars into a packaging machine, a scar band in which scars are formed in a band-shaped region need be previously formed on the film at a position to coincide with a side edge portion or joint portion of an intended package-joining belt in accordance with the size, shape and the like of a package to be manufactured. For this reason, time is required for processing a film to be put into the packaging machine; that is the so-called lead time for manufacture is necessary. In addition, scarred films each suited to a respective one of packages to be manufactured need be prepared troublesomely.

Further, the provision of scars causes the tensile strength of the film to lower, which is one of packaging operation restricting factors. With a packaging machine configured to draw a film with a large tensile force, such as a high-speed packaging machine for example, a trouble occasionally occurs such that a film formed with scars tears during the packaging operation, which lowers the operating efficiency considerably. Particularly, in adjusting the packaging machine so that a mark printed on a film will be positioned centrally of the resulting package, the position of the mark is adjusted by utilizing the resistance of the belt-shaped film. In such a case, a film formed with scars has insufficient tensile strength for such adjustment, which makes the adjustment very difficult actually.

Although, presently, such easy-to-open packages are manufactured using scarred films solely, there has not so far been known any radical means to solve the foregoing problems essential to such scarred films as a result of study made by those skilled in the art but some studies to improve only the characteristics of film itself. The inventors of the present invention have intensively and repeatedly studied in pursuit of such radical means with their attention focused on the problems which have been half overlooked and have attained the present invention.

The present invention, which has been made under such circumstances to solve the foregoing problems, has an object to provide a method and system for manufacturing easy-to-open packages using a scar-free film.

SUMMARY OF THE INVENTION

According to the present invention, there are provided a method and system for manufacturing a package, comprising:

a package-joining belt forming step and means for forming a package-joining belt in which packages each containing a material filled in between superposed scar-free films and each sealed at joint portions and a side edge portion are joined with each other by the joint portions, the package-joining belt forming step including: a superposing process of folding one belt-shaped film widthwise or superposing two belt-shaped films one upon the other, to form superposed films; a joint portion forming process of forming band-shaped joint portions at predetermined intervals longitudinally of the superposed films, the joint portions each extending over an entire width of the superposed films and joining the superposed films together; a side edge portion forming process of forming a band-shaped side edge portion joining the superposed films together along at least one side edge of the superposed films; and a filling process of filling the material into regions defined by the joint portions and the side edge portion; and a scar forming step and means for forming plural elongate scars each extending adjacent and substantially perpendicularly to said side edge in the side edge portion, wherein the package-joining belt forming step and the scar forming step, or the package-joining belt forming means and the scar forming means are carried out or driven, while the package-joining belt is drawn.

This method and system make it possible to manufacture easy-to-open packages each having plural elongate scars formed to extend adjacent and substantially perpendicularly to a side edge in a side edge portion thereof with use of a scar-free film. Hence, the method and system can reduce the cost of manufacturing such easy-to-open packages and shorten the lead time for the manufacture of the easy-to-open packages. Further, since each package is not yet turned into an easy-to-open package at the time of package sealing, a displacement of the film can be corrected by applying a tensile force to the film. Therefore, it becomes easy to adjust the position of the film during the manufacture of the packages in order to prevent a printed mark on the surface of each package from being displaced.

In preferred embodiments of the method and system for manufacturing a package, the scar forming step and means cause the package-joining belt to pass between a processing roller and a press roller with a portion thereof adjacent said side edge in the side edge portion being sandwiched therebetween, the processing roller comprising plural disks each having plural cutting edges extending substantially in a thickness direction thereof and formed over an entire circumference thereof, the plural disks being stacked in a manner that the cutting edges of one disk are spaced apart from those of an adjacent disk, the press roller having a smooth peripheral surface, the processing roller and the press roller being positioned in a manner that the cutting edges of the processing roller are allowed to come into substantial contact with the peripheral surface of the press roller.

Such a feature enables the above-described invention to be carried out easily and reliably. Further, since this feature allows the number of stacked disks to increase or decrease in accordance with a processing precision with which the package-joining belt is to be processed, unnecessary cutting edges can be eliminated.

The method and system for manufacturing a package may further include any one of steps or means including: a perforating step or means for forming perforations in the joint portions; a cutting step or means for cutting off each of the packages from the package-joining belt; a folding step or means for folding the package-joining belt to a predetermined length, and a take-up step or means for taking up the package-joining belt into a roll.

This feature allows packages to be subjected to predetermined processing and, hence, can improve the function of the system for manufacturing a package.

The method and system for manufacturing a package according to the present invention make it possible to manufacture easy-to-open packages each having plural elongate scars formed to extend adjacent and substantially perpendicularly to the side edge in the side edge portion with use of a scar-free film and hence enjoy the advantages in reducing the cost of manufacturing such easy-to-open packages, shortening the lead time for the manufacture of the easy-to-open packages, relaxing the restricting conditions imposed on the packaging operation due to the film having poor tensile strength, and facilitating positional adjustment of a printed surface of the film during the manufacture of the easy-to-open packages.

The foregoing and other objects, features and attendant advantages of the present invention will become more apparent from the reading of the following detailed description of the invention in conjunction with the accompanying drawings.

DETAILED DESCRIPTION OF THE PREFERRED EMBODIMENTS

Hereinafter, preferred embodiments of the present invention will be described in detail with reference to the drawings.

Embodiment 1

Initially, description will be made of the construction of a package manufacturing system (a system for manufacturing a package) 200 according to this embodiment.

Figure 1:
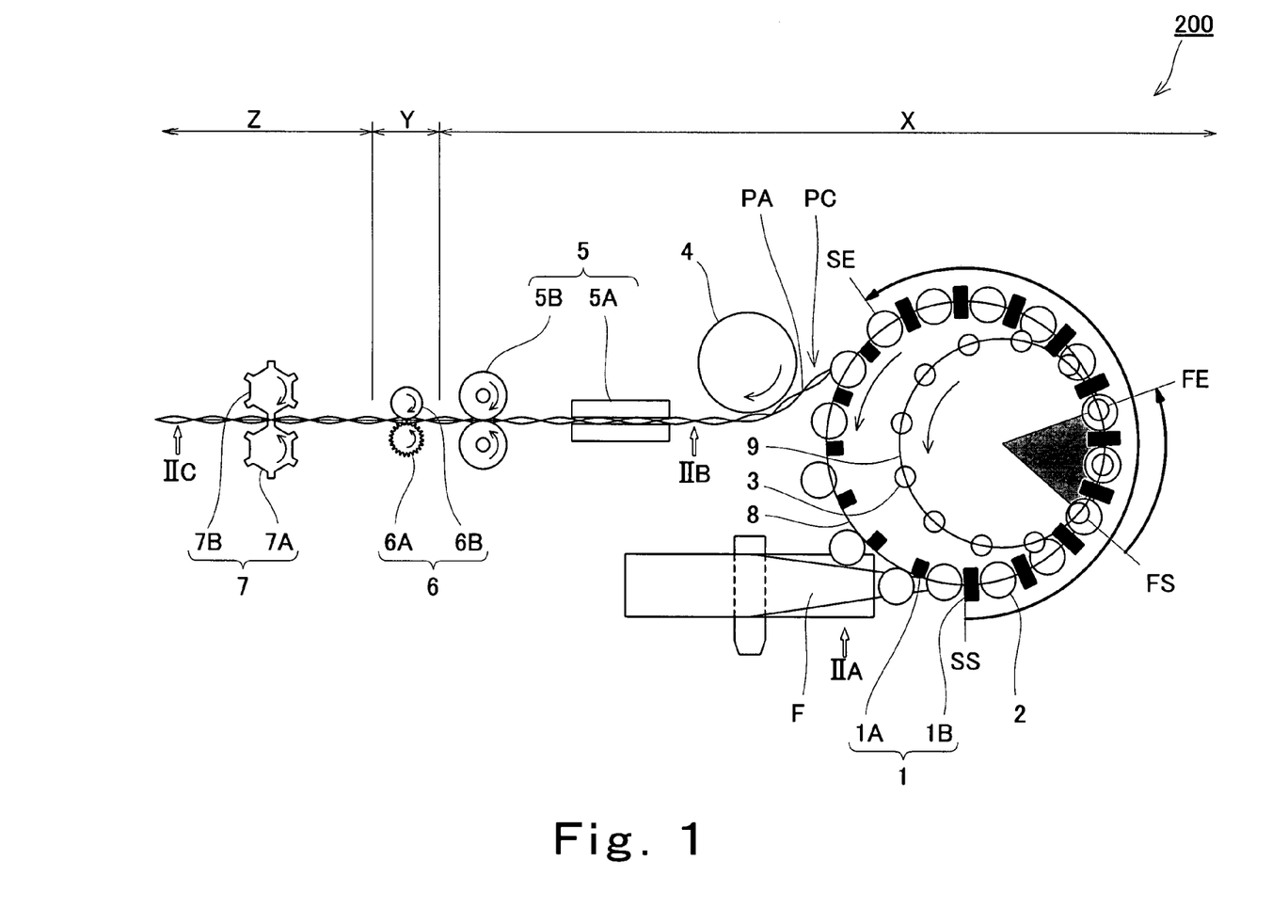
FIG. 1 is a top plan view schematically showing an example of the construction of a system for manufacturing a package according to embodiment 1 of the present invention.
Figure 2A:
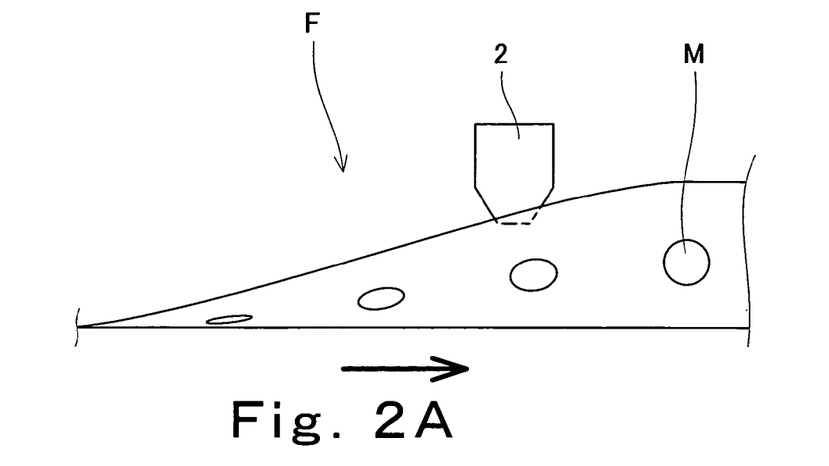
FIGS. 2A, 2B and 2C are each a view as viewed in a respective one of the directions indicated by arrows IIA, IIB and IIC of FIG. 1.
Figure 2B:
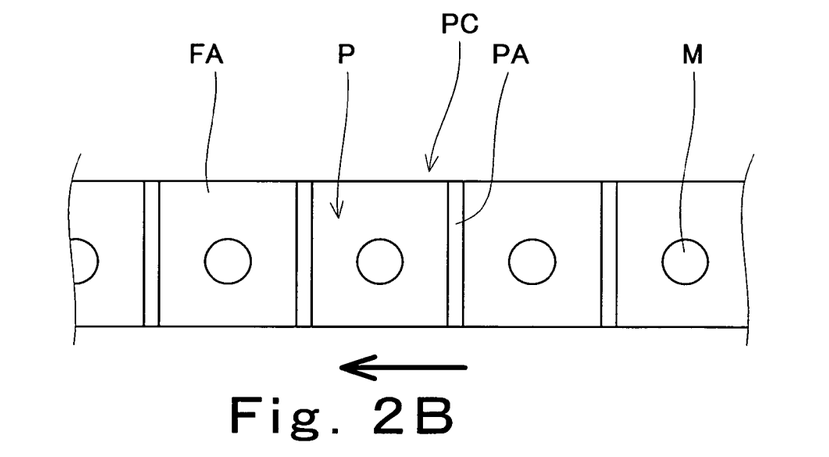
Figure 2C:
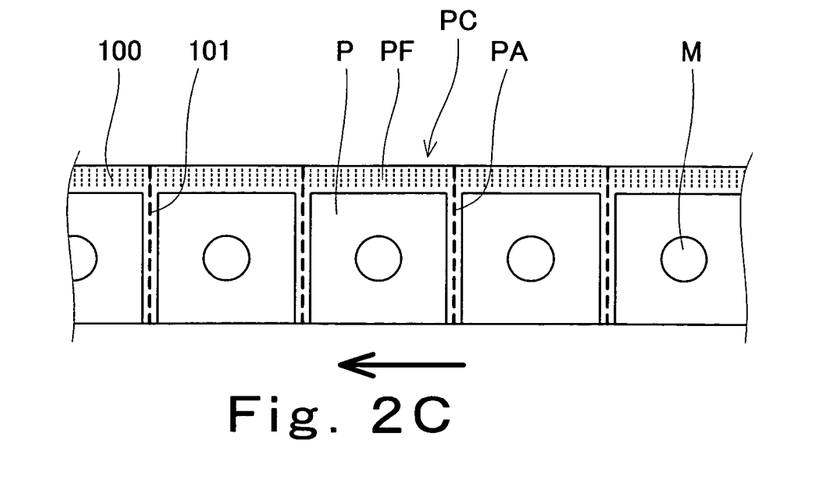

FIG. 1 is a top plan view schematically showing an example of the construction of the package manufacturing system according to embodiment 1 of the present invention; and FIGS. 2A, 2B and 2C are each a view as viewed in a respective one of the directions indicated by arrows IIA, IIB and IIC of FIG. 1.

Referring to FIG. 1, the package manufacturing system 200 includes a package-joining belt forming unit X, a scar forming unit Y, and a package processing unit (perforating unit) Z. These units are disposed so that a package-joining belt PC formed from a belt-shaped film F or a film F passes through the package-joining belt forming unit X, scar forming unit Y and package processing unit Z in this order. The package-joining belt forming unit X includes inner peripheral seal bars 1A, outer peripheral seal bars 1B, filling chutes 2, dispensing measures 3, guide roller 4, heat-sealing device 5, and rotating drum 8, which are arranged to form package-joining belt PC from film F. The scar forming unit Y includes a scarring device 6 configured to form scars 100 in a side edge portion PF of the package-joining belt PC, as shown in FIG. 2C. The package processing unit Z includes a perforating device 7 configured to form perforations 101 in joint portions PA of the package-joining belt PC, as shown in FIG. 2C. The film F, as used here, is formed of a resin film, a composite film comprising a stack of resin film and metal foil, or a like film. Therefore, heat sealing to be described later is possible. The film F bears printed marks M, each of which will assume a predetermined position on a package P.

Here, description is directed to the structure of each of the devices included in the system 200.

The rotating drum 8 is shaped cylindrical, has a vertically extending rotating shaft, and is configured so that its periphery rotates in a horizontal plane. The film F, in a state folded transversely, or widthwise in a manner that its opposite side edges are superposed upon each other, is entrained about the periphery of the rotating drum 8 with its fold and superposed side edges in a lower position and an upper position, respectively.

The inner peripheral seal bars 1A each extending vertically are mounted on the inner peripheral wall of the rotating drum 8 with a space substantially equal to the width of package P between adjacent ones. The inner peripheral seal bars 1A revolve with rotation of the rotating drum 8.

The outer peripheral seal bars 1B are arranged in pairs with the inner peripheral seal bars 1A. As shown, the outer peripheral seal bars 1B are each positioned opposite to a respective one of the inner peripheral seal bars 1A within a revolving section from seal start point SS to seal finish point SE. Though not shown, the outer peripheral seal bars 1B revolve as retracted downward within other revolving section than the revolving section from seal start point SS to seal finish point SE.

As shown, the inner peripheral seal bars 1A and the outer peripheral seal bars 1B revolve on the periphery of the rotating drum 8 while sandwiching the major plane of the folded film F within the revolving section from seal start point SS to seal finish point SE. Thus, the inner peripheral seal bars 1A and the outer peripheral seal bars 1B heat-seal the sandwiched film F over the entire width thereof at predetermined intervals in the longitudinal direction to form band-shaped joint portions PA. The joint portions PA form sealed boundaries each between adjacent packages P and pouch portions each in a region defined between adjacent joint portions PA. The film 4 pressed between the inner peripheral seal bars 1A and the outer peripheral seal bars 1B is drawn by rotation of the rotating drum 8.

The filling chutes 2 are each located above the space between adjacent inner peripheral seal bars 1A and revolve along the periphery of the drum 8 in synchronization with the inner peripheral seal bars 1A. The filling chutes 2 are inserted between superposed halves of film F folded at its lower edge to guide a filling material dispensed from the dispensing measures 3 into respective packages PC.

The dispensing measures 3 are disposed on a circle inscribed in the peripheral wall of the rotating drum 8 in plan view with spacing between adjacent ones which is substantially equal to the spacing with which adjacent ones of the inner peripheral seal bars 1A are disposed. The dispensing measures 3 revolve on the inscribed circle. Within the revolving section from filling start point FS to filling finish point FE each of the dispensing measures 3 is positioned between adjacent inner peripheral seal bars 1A and revolves above and along the rotating drum 8. Thus, the filling material within each dispensing measure 3 is filled into a respective one of the packages P through the associated filling chute 2.

The guide roller 4 is disposed downstream of the rotating drum 8 at a location adjacent to and outwardly of the seal finish point SE in the direction in which the package-joining belt PC is fed. The guide roller 4 guides the package-joining belt PC filled with the filling material to the heat-sealing device 5.

The heat-sealing device 5 is disposed downstream of the guide roller 4 in the package-joining belt feed direction. The heat-sealing device 5 comprises a pair of preheat bars 5A and a pair of die rollers 5B. The preheat bars 5A and the die rollers 5B are positioned to sequentially sandwich the side edge portion of the package-joining belt PC in which opposite side edges of the film F are superposed on each other. The thus configured heat-sealing device 5 heat-seals a portion adjacent the superposed side edges thereby to form a band-shaped side edge portion PF of each package P. A non-illustrated rotation driver rotates the die rollers 5B in opposite directions in synchronization with the rotating drum 8 so that the die rollers 5B draw in the package-joining belt PC toward the downstream side.

The scarring device 6 is disposed downstream of the heat-sealing device 5 in the package-joining belt feed direction. The scarring device 6 comprises a processing roller 6A, a press roller 6B, and a non-illustrated rotation driver. The processing roller 6A and the press roller 6B are juxtaposed with each other in such a manner that their respective peripheral surfaces substantially contact each other. The processing roller 6A and the press roller 6B are positioned so that a portion adjacent the side edge in the side edge portion PF of the package-joining belt PC having been formed by the heat-sealing device 5 is nipped therebetween and passed therethrough. Further, the processing roller 6A is positioned so as not to contact other portion of each package P than the side edge portion PF. Thus, this arrangement can prevent each package P from being scarred in other portion than the side edge portion PF, thereby preventing the filling material therein from leaking therefrom.

Figure 3A:
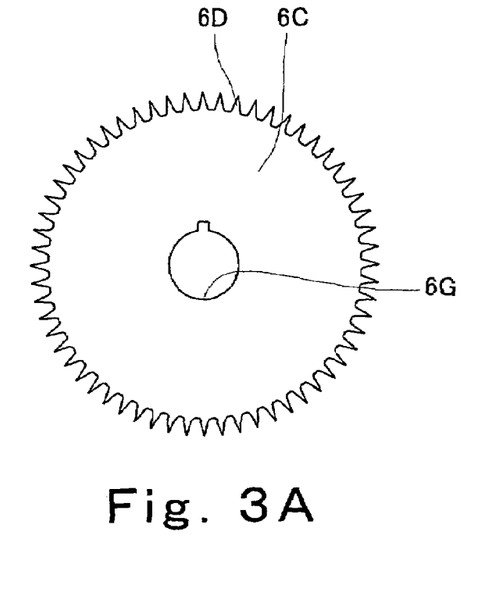
FIG. 3A is a plan view schematically showing the structure of a processing roller of a scarring device shown in FIG. 1 according to the present invention.
Figure 3B:
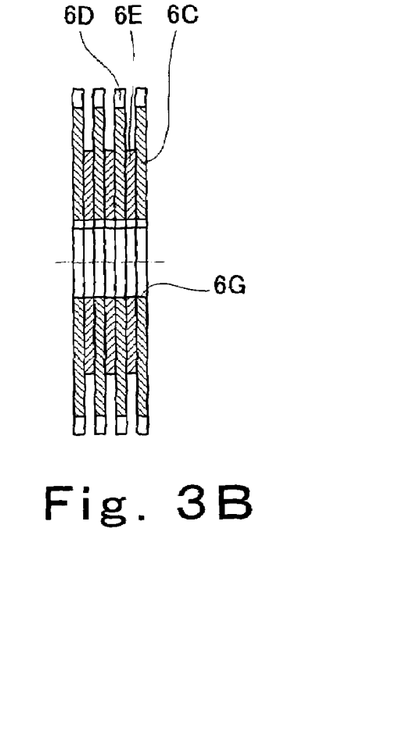
FIG. 3B is a side elevational view showing the structure of the processing roller of the scarring device shown in FIG. 1 according to the present invention.

FIG. 3A is a plan view schematically showing the structure of the processing roller of the scarring device shown in FIG. 1 according to the present invention; and FIG. 3B is a side elevational view showing the structure of the processing roller of the scarring device shown in FIG. 1 according to the present invention.

As shown in FIGS. 3A and 3B, the processing roller 6A comprises plural (four in the figures) thin toothed disks 6C of a high speed tool steel which are stacked coaxially. Each of the disks 6C has an outer periphery formed with cutting edges 6D at intervals of about 2 mm over the entire circumference thereof, the cutting edges 6D each having a short edge width along the thickness thereof. With such a processing roller 6A, the number of stacked disks 6C can be increased or decreased to meet the processing precision for the package-joining belt PC, whereby unnecessary cutting edges 6D can be eliminated. The thickness of each disk 6C is 0.45 mm. Since the thickness of each disk 6C is the edge width of each cutting edge 6D, which determines the length of each scar 100 to be formed on each package P (see FIG. 2C), the thickness of disk 6C is desirably 0.3-0.5 mm, which is empirically determined from the relation between the openability imparted to each package by scars and the tensile strength of the package. With this feature, it is possible to suppress the decrease in the tensile strength of package P due to scars as well as to impart package P with an easy-to-open property.

In stacking the disks 6C the cutting edges 6D of one disk 6C are positioned as spaced apart from those of an adjacent disk 6C. That is, the processing roller 6A comprising the stacked disks 6C has plural cutting edges 6D formed all over the roller surface, each of the cutting edges 6D having a short edge width extending substantially axially of the processing roller 6A. Specifically, the disks 6C are stacked in such a manner that the cutting edges 6D of one disk 6C are positioned offset with respect to those of an adjacent disk 6C, so that the cutting edges 6D of one disk 6C are spaced apart from those of the cutting edges 6D of an adjacent disk 6C. For example, such disks 6C can be formed by simply displacing the cutting edge 6D forming position of one disk with respect to the key groove of the shaft bearing hole 6G from that of another.

In this embodiment, a thin spacer 6E having a thickness of about 0.1 to about 0.3 mm is interposed between each pair of adjacent disks 6C stacked, as shown in FIG. 3B. The provision of such spacers 6E spaces the cutting edges 6D of one disk 6C apart from those of an adjacent disk 6C by a spacing not less than the thickness of spacer E, thereby eliminating the time and labor for and the cost of forming disks 6C by displacing the cutting edge forming position of one disk from that of another.

Figure 4A:
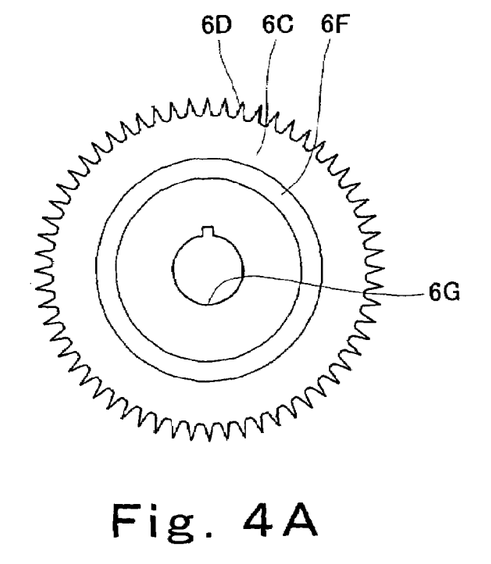
FIG. 4A is a plan view schematically showing the structure of an alternative processing roller of the scarring device shown in FIG. 1 according to the present invention.
Figure 4B:
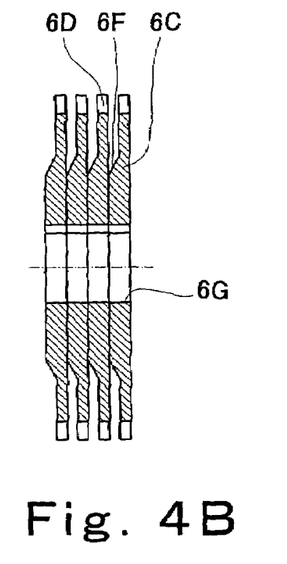
FIG. 4B is a side elevational view showing the structure of the alternative processing roller of the scarring device shown in FIG. 1 according to the present invention.

Alternatively, each disk 6C may be formed to have a thicker central portion and a thinner peripheral portion. FIG. 4A is a plan view schematically showing the structure of an alternative processing roller of the scarring device shown in FIG. 1 according to the present invention; and FIG. 4B is a side elevational view showing the structure of the alternative processing roller of the scarring device shown in FIG. 1 according to the present invention. As shown in FIGS. 4A and 4B, one of the opposite main surfaces of each disk 6C is formed with a step 6F between a central portion thereof and a peripheral edge portion thereof. Such a step 6F provides a space between the peripheral surface of one disk 6C and that of an adjacent disk 6C, more exactly, between the cutting edges 6D of one disk 6C and those of an adjacent disk 6C. Therefore, it is possible to eliminate the spacers 6E as well as the time and labor for forming disks 6C by displacing the cutting edge forming position of one disk from that of another.

A non-illustrated shaft is inserted through the shaft bearing holes 6G with key grooves of the disks 6C thus stacked and then the stack of disks 6C is clamped from the opposite ends of the shaft so as to be fixed on the shaft.

Since the press roller 6B is juxtaposed with the processing roller 6A in such a manner that the smooth peripheral surface of the press roller 6B contacts cutting edges 6D of the processing roller 6A, the side edge portion PF of the package-joining belt PC having passed through the heat-sealing device 5 is sandwiched between the processing roller 6A and the press roller 6B. In this embodiment, the processing roller 6A and the press roller 6B are biased against each other with a spring so that their respective roll surfaces contact each other. Further, since the processing roller 6A bites a portion adjacent the side edge of the side edge portion PF, the scarring device 6 cannot contact each package P except the side edge portion PF and hence never impairs the tight seal of package P.

The rotation driver rotates the processing roller 6A and the press roller 6B in synchronization with rotation of the rotating drum 8 to feed the package-joining belt PC toward the downstream side. Specifically, the processing roller 6A and the press roller 6B rotate in opposite directions to draw in the package-joining belt PC.

The perforating device 7 is disposed downstream of the scarring device 6 in the package-joining belt feed direction. The perforating device 7 comprises a cutting-toothed roller 7A, and a press roller 7B, and a non-illustrated rotation driver, the rollers 7A and 7B being positioned to nip the package-joining belt PC therebetween. The non-illustrated rotation driver rotates the pair of rollers 7A and 7B to feed the package-joining belt PC toward the downstream side. Specifically, the rollers 7A and 7B rotate in opposite directions to draw in the package-joining belt PC. The rotation driver rotates the pair of rollers 7A and 7B so that the cutting edges of the cutting-toothed roller 7A contact each of joint portions PA. The cutting-toothed roller 7A is formed with perforating edges. The perforating edges form perforations 101 through each joint portion PA of the package-joining belt PC during passage of the belt PC through the perforating device 7. If the cutting-toothed roller 7A is formed with blades instead of the perforating edges, the perforating device 7 can serve as a cutting device for cutting off each package P from the package-joining belt PC. Also, if the cutting-toothed roller 7A is formed with perforating edges and blades in alternate arrangement, the perforating device 7 is modified to cut off a pair of joined packages P having perforations inbetween from the package-joining belt PC.

With reference to FIGS. 1, 2A, 2B, and 2C, description will be made of an example of the operation of the package manufacturing system 200 thus constructed.

First, description is directed to an example of the operation of the package-joining belt forming unit X (package-joining belt forming step). Belt-shaped film F in a rolled state is paid out and drawn with rotation of the rotating drum 8 while being pressed between the inner peripheral seal bars 1A and the outer peripheral seal bars 1B.

The film F thus paid out is entrained about the rotating drum 8. Specifically, the film F is folded in such a manner that its opposite side edges are superposed on each other (superposing process) as shown in FIG. 2A and then entrained over the periphery of the rotating drum 8 with its fold and superposed side edges positioned high and low, respectively. In superposing the opposite side edges of the film F, the lower end of each filling chute 2 is inserted between the opposite side edges. Though not described in detail, each filling chute 2 slides up at a point past the seal finish point SE in the direction of revolution and then reaches the seal start point SE while sliding down from above the film F to recur to the revolution track. Thus, the lower end of each filling chute 2 can easily be inserted between the opposite side edges of the film F.

Within the revolving section from the seal start point SS to the seal finish point SE the film F on the periphery of the rotating drum 8 is sandwiched between and heat-sealed by the inner peripheral seal bars 1A and the outer peripheral seal bars 1B to form package-joining belt PC having a heat-sealed portion between each pair of adjacent packages P (joint portion forming process). From this state shown in FIG. 2B, each package P will be in a completed state if the package P is filled with the filling material and then sealed at the fill opening FA defined along the upper edge of the folded film F.

Subsequently, the filling material is filled into each package P through the fill opening FA from the associated one of the filling chutes 2 within the revolving section from the filling start point FS to the filling finish point FE (filling process).

The package-joining belt PC thus filled with the filling material is guided by the guide roller 4 to leave the rotating drum 8 and then passes through the heat-sealing device 5. In the heat-sealing device 5 the fill opening portion FA of the film F is preheated by the preheat bars 5A and then heat-sealed by the die rollers 5B to form side edge portion PF having projections and depressions on the surface thereof (side edge portion forming process). In this way, packages P sealed at joint portions PA and side edge portion PC is completed to form the package-joining belt PC.

The next description is directed to an example of the operation of the scar forming unit Y (scar forming step). The package-joining belt PC passes through the scarring device 6. In the scarring device 6 the processing roller 6A and press roller 6B bite the side edge portion PF to form scars 100. As the package-joining belt PC is fed in the direction in which packages are joined with each other, the processing roller 6A biting the side edge portion PF rotates, so that its cutting edges sequentially bite the side edge portion PF to form new scars. In this way, the scarring device 6 forms a plurality of elongate fine scars extending adjacent and substantially perpendicularly to the side edge in the side edge portion PF of each package P. The package P thus formed with such scars has become an easy-to-open package.

Finally, description is directed to an example of the operation of the package processing unit Z (perforating step). The package-joining belt PC is guided to the perforating device 7. The perforating device 7 forms perforations 101 through each joint portion PA between adjacent packages P. The package-joining belt PC thus processed is as shown in FIG. 2C.

The above-described package manufacturing system 200 according to the present invention makes it possible to manufacture easy-to-open packages P each having plural elongate scars 100 formed to extend adjacent and substantially perpendicularly to the side edge in the side edge portion PF with use of a scar-free film. Hence, the system 200 is capable of reducing the cost of manufacturing easy-to-open packages P and shortening the lead time for the manufacture of the easy-to-open packages P. Further, since each package P is not yet processed into such an easy-to-open package at the time of package sealing, adjustment of the resistance of film F to payout allows a tensile force to work on film F being drawn by the rotating drum 8, thereby correcting a displacement of mark M on the film F being drawn by the rotating drum 8. That is, the system 200 allows the position of the film F to be adjusted during the manufacture of packages P in order to prevent printed mark M on the surface of the package P from being displaced.

Embodiment 2

Embodiment 2 includes a package-joining belt forming unit X which is advantageously used when the filling material is a liquid. Since the structure and operation of scar forming unit Y used in this embodiment are the same as in embodiment 1, description thereof will be omitted.

Figure 5:
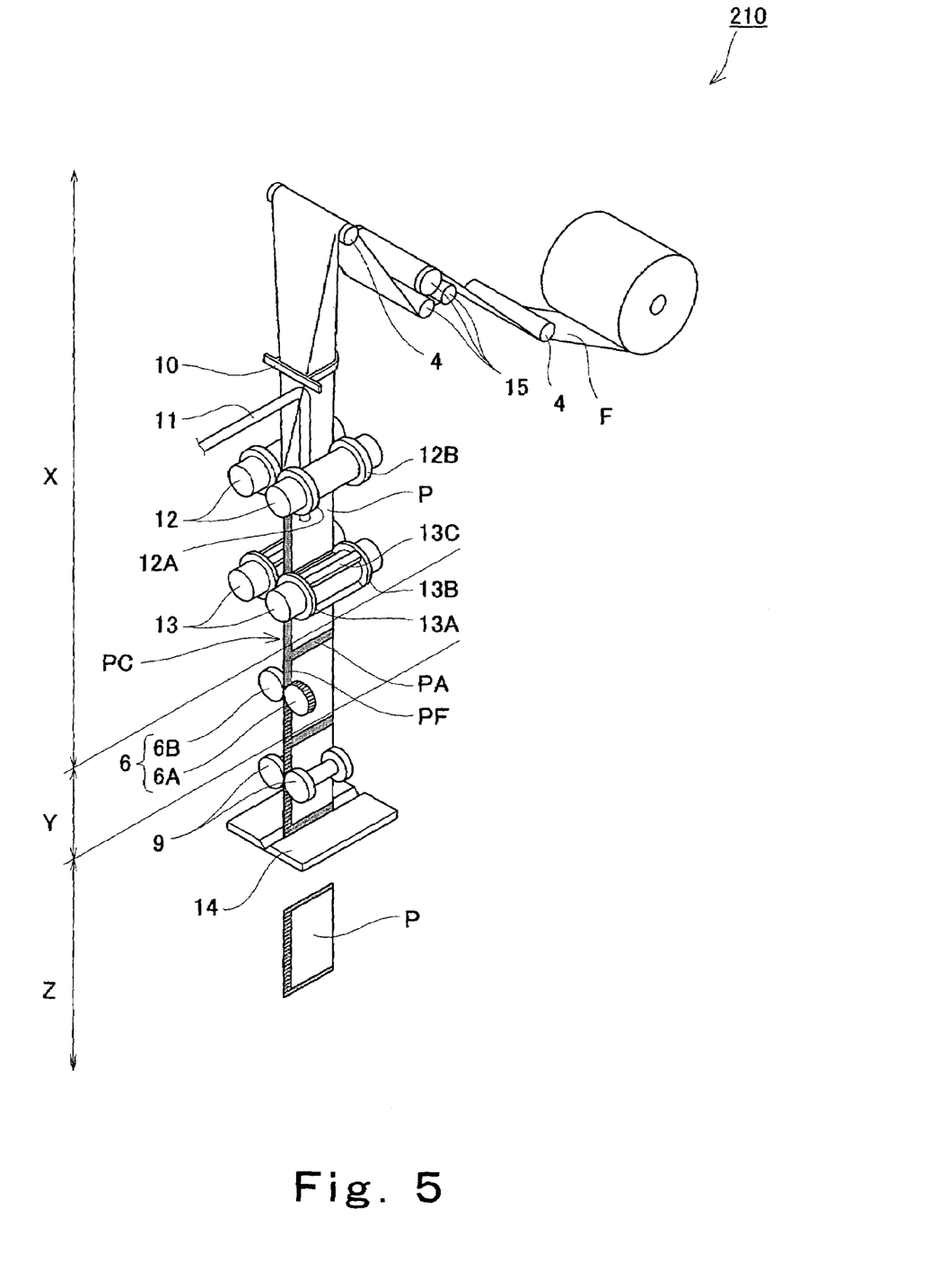
FIG. 5 is a perspective view schematically showing an example of the construction of a system for manufacturing a package according to embodiment 2 of the present invention.

FIG. 5 is a perspective view schematically showing an example of the construction of a package manufacturing system according to embodiment 2 of the present invention. Like reference characters are used to designate like or corresponding parts throughout FIGS. 1 and 5 to eliminate description thereof.

The package manufacturing system 210 shown includes package-joining belt forming unit X, scar forming unit Y, and package processing unit (cutting unit) Z, the units X, Y and Z being arranged vertically as a whole. These units are disposed so that package-joining belt PC formed from a belt-shaped film F or a film F passes through the package-joining belt forming unit X, scar forming unit Y and package processing unit Z in this order. The package-joining belt forming unit X includes draw rollers 15, guide rollers 4, guide member 10, filling nozzle 11, first heat-sealing roller 12, and second heat-sealing roller 13. The package-joining belt forming unit X forms package-joining belt PC from film F. The package processing unit Z includes a feed roller 9, and a cutting device 14 for cutting joint portions PA of the package-joining belt PC to sever each package P from the package-joining belt PC.

Here, description is directed to the structure of each of the devices included in the system 210.

The draw rollers 15 are positioned to draw and pay out film F from a roll of film. The guide rollers 4 guide the film F thus paid out to the guide member 10.

The guide member 10 has a U-shaped frame positioned substantially horizontally. The film 4 is passed downwardly through the frame. The guide member 10 curves the film 4 in such a manner that the opposite side edges of the film 4 face each other.

The first heat-sealing roller 12 comprises a pair of rollers and a non-illustrated rotation driver. Each of the rollers has a peripheral surface formed with two flange-shaped protrusions 12A and 12B arranged axially thereof. The pair of rollers are located below the guide member 10 in such a manner as to contact each other at their protrusions 12A and 12B and with their respective axes of rotation oriented horizontally. The first heat-sealing roller 12 is configured to heat the surfaces of the pair of rollers. The pair of rollers are rotated by the rotation driver to feed the film F downwardly. The film F curved by the guide member 10 is so positioned that its opposite side edges facing each other pass between the protrusions 12A of respective of the pair of rollers. Thus, the facing side edges of the film F are heat-sealed by heat from the protrusions 12A to form a band-shaped side edge portion PF. Since the pair of rollers define therebetween a gap extending between the protrusions 12A and the protrusions 12B, a tubular nozzle of the filling nozzle 11 can be inserted into the gap.

The filling nozzle 11 extends between the guide member 10 and the first heat-sealing roller 12 in such a manner as to insert the tubular nozzle thereof between the facing side edges of the film F. The nozzle end portion of the filling nozzle 11 extends through the rollers of the heat-sealing roller 12 to reach a location below the heat-sealing roller 12. The filling nozzle 11 is connected with a filling material supply line (not shown) and configured to receive the filling material therein according as the second heat-sealing roller 13 operates. Thus, the filling nozzle 11 can fill the filling material into each package P. Prior to the filling of the filling material, the heat-sealing roller 13 heat-seals a portion of the film F that will form a lower edge of each package P.

The second heat-sealing roller 13 comprises a pair of rollers, and a non-illustrated rotation driver. Each of these rollers is formed with flange-shaped protrusions 13A and 13B at axially opposite end portions thereof and at least one axially extending protrusion 13C interlinking the protrusions 13A and 13B. The pair of rollers are located below the nozzle end of the filling nozzle 11 in such a manner as to contact each other at their protrusions 13A, 13B and 13C with their respective axes of rotation oriented horizontally. The second heat-sealing roller 13 is configured to heat the surfaces of the pair of rollers. The pair of rollers are rotated by the rotation driver to feed the film F downwardly. The film F having been formed with the side edge portion PF by the first heat-sealing roller 12 is positioned to pass through the second heat-sealing roller 13. Thus, the film F is drawn downwardly by the second heat-sealing roller 13 to form package-joining belt PC. Specifically, the film F is heat-sealed at its portions brought into contact with the protrusions 13C to form joint portions PA each defining a sealed boundary between adjacent packages P. Such joint portions PA form the top and bottom portions of each package P. Since the protrusions 13C contact the film F according as the second heat-sealing roller 13 rotates, the distance between adjacent joint portions PA defining each package P, i.e., the size of each package P can be adjusted by adjusting the rotational speed of the second heat-sealing roller 13.

The scarring device 6 comprises processing roller 6A and press roller 6B, which are located below the second heat-sealing roller 13 and configured to rotate to feed the package-joining belt PC downwardly in synchronization with rotation of the first heat-sealing roller 12. Alternatively, the scarring device 6 may be located intermediate the first and second heat-sealing rollers 12 and 13.

The feed roller 9 is disposed below the scar forming unit Y to feed the package-joining belt PC downwardly.

The cutting device 14 is disposed below the feed roller 9. The cutting device 14 has a pair of cutting edges extending substantially horizontally and is driven to press the cutting edges against each joint portion PA of the package-joining belt PC. Thus, the cutting device 14 cuts each joint portion PA of the package-joining belt PC to sever each package P from the package-joining belt PC.

With reference to FIG. 5, description will be made of an example of the operation of the package manufacturing system 210 thus constructed.

First, description is directed to an example of the operation of the package-joining belt forming unit X (package-joining belt forming step). Belt-shaped film F in a rolled state is paid out and drawn by the draw rollers 15 and then passed through the U-shaped frame of the guide member 10 where the film F is curved in such a manner that its opposite side edges face each other (superposing process).

The film F thus curved is brought into contact with the first heat-sealing roller 12, whereby the superposed side edges of the film F are joined together to form side edge portion PC (side edge portion forming process). With the filling nozzle 11 being interposed in the folded film F, the film F is brought into contact with the second heat-sealing roller 13 to seal the boundary between adjacent packages P, thus forming joint portion PA (joint portion forming process). Also, the filling material is filled into each package P through the filling nozzle 11 (filling process).

The top portion, i.e., joint portion PA, of package P thus filled with the filling material is heat-sealed by the protrusions 13C of the second heat-sealing roller 13 (joint portion forming process). In this way, packages P each sealed at joint portions PA and side edge portion PC are completed to form the package-joining belt PC.

The operation of the scar forming unit Y (scar forming step) is the same as in the package manufacturing system 200 according to embodiment 1.

Finally, description is directed to an example of the operation of the package processing unit Z (cutting step). The package-joining belt PC passes through the feed roller 9 and the cutting device 14. In the cutting device 14 the pair of cutting edges are pressed against each joint portion PA to cut off each package P.

The above-described package manufacturing system 210 according to the present invention makes it possible to manufacture easy-to-open packages P each having plural elongate fine scars 100 formed to extend adjacent and substantially perpendicularly to the side edge in side edge portion PF with use of a scar-free film F. Hence, the system 210 enjoys the same advantage as embodiment 1.

Embodiment 3

Embodiment 3 is an embodiment wherein package processing unit Z is a folding unit configured to fold package-joining belt PC. Since the package manufacturing system according to this embodiment is similar to the foregoing package manufacturing system 200 or 210 in the structure and operation of each of package-joining belt forming unit X, scarring device 6 and feed roller 9, description of the structures and operations of these components will be omitted and description will be made of the structure and operation of each of scar forming unit Y and package processing unit Z.

Figure 6:
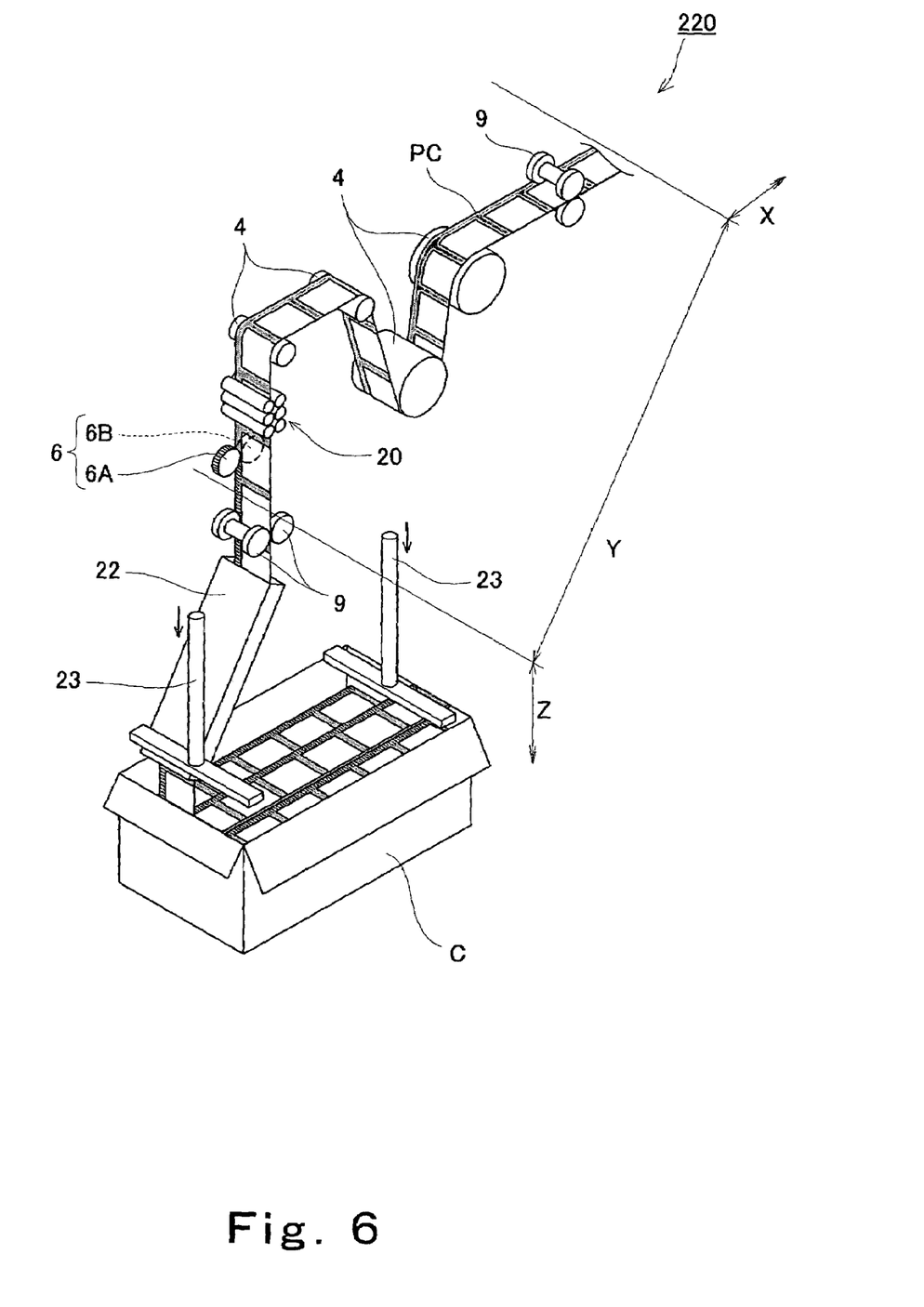
FIG. 6 is a perspective view schematically showing an arrangement of a scar forming unit and a package processing unit in a system for manufacturing a package according to embodiment 3 of the present invention.

FIG. 6 is a perspective view schematically showing an arrangement of a scar forming unit and a package processing unit in the package manufacturing system according to embodiment 3 of the present invention. Like reference characters are used to designate like or corresponding parts throughout FIGS. 1, 2A, 2B, 2C, and 6 to eliminate description thereof. In FIG. 6 the package-joining belt forming unit X is not shown.

The scar forming unit Y of the package manufacturing system 220 includes feed roller 9, guide rollers 4, package detecting device 20, and scarring device 6. The package processing unit (folding unit) Z includes feed roller 9, guiding device 22, and depressing device 23. Package-joining belt PC is positioned to pass through the scar forming unit Y and the package processing unit Z in this order.

Here, description is directed to the structure of each of the devices included in the system 220. The guide rollers 4 and the feed rollers 9 are disposed to guide package-joining belt PC to the package detecting device 20.

The package detecting device 20 includes plural small-diameter rollers which are resiliently supported so that their respective roller surfaces normally contact each other. As the package-joining belt PC passes between these rollers in the direction in which packages P of the belt PC are joined with each other, the positions of the rollers of the package detecting device 20 fluctuate with varying thickness of the package-joining belt PC, whereby passage of each package P can be detected. A non-illustrated counter connected to the package detecting device 20 counts the number of packages P having passed through the package detecting device 20. When a predetermined number of packages P is reached, the scar forming unit Y and the package processing unit Z are stopped operating.

The scarring device 6 comprises processing roller 6A and press roller 6B, which are located downstream of the package detecting device 20 in the direction in which the package-joining belt PC is fed and which are rotated to feed the package-joining belt PC downstream.

The feed roller 9 is disposed downstream of the scarring device 6 in the package-joining belt feed direction to feed the package-joining belt PC downstream.

The guiding device 22 is disposed downstream of the feed roller 9 in the package-joining belt feed direction. The guiding device 22 comprises a hollow rectangular-parallelepiped member having opposite open ends oriented upwardly and downwardly, respectively. The hollow member is pivotally supported at its lower end. Package-joining belt PC inserted into the guiding device 22 from the upper open end and then exiting from the lower open end is folded to an appropriate length and stacked by pivotal movement of the guiding device 22.

The depressing device 23 comprises a pair of plate members which are configured to depress the folded package-joining belt PC in a container case C in the direction indicated by arrow in FIG. 6. Thus, the depressing device 23 can restrain the folded package-joining belt PC from bulging in the container case C thereby reliably storing package-joining belt PC within the container case C.

With reference to FIG. 6, description will be made of an example of the operation of the package manufacturing system 220 thus constructed.

First, description is directed to an example of the operation of the scar forming unit Y (scar forming step). Package-joining belt PC prepared by non-illustrated package-joining belt forming unit X is gradually drawn by the feed roller 9 into the scar forming unit Y via guide rollers 4. Packages P of the package-joining belt PC past the guide rollers 4 are sequentially detected by the package detecting device 20.

The package-joining belt PC having passed through the package detecting device 20 is then passed through the scarring device 6, which forms scars on the side edge portion PF of the package-joining belt PC. Thus, each package P has become an easy-to-open package having side edge portion PF formed with plural elongate scars each extending adjacent and substantially perpendicularly to the side edge.

Next, description is directed to an example of the operation of the package processing unit (folding step) Z. The feed roller 9 of the package processing unit Z feeds the package-joining belt PC to the guiding device 22. The guiding device 22 folds the package-joining belt PC to a length suited to the size of container case C (folding step). After each folding of the package-joining belt PC within the container case C, the depressing device 23 depresses the package-joining belt PC into the container case C.

When the number of packages P included in the package-joining belt PC thus folded reaches a predetermined number, the scar forming unit Y and the package processing unit Z stop operating. In turn, the operator cuts off the folded package-joining belt PC at a portion thereof close to the container case C.

The above-described package manufacturing system 220 according to the present invention makes it possible to manufacture easy-to-open packages P each having plural elongate scars 100 formed to extend adjacent and substantially perpendicularly to the side edge in side edge portion PF with use of a scar-free film F. Hence, the package manufacturing system 220 enjoys the same advantage as the foregoing system 200 or 210. Further, since the package manufacturing system 220 can carry out predetermined processing on packages P, the system 220 has an improved function.

Embodiment 4

Embodiment 4 is an embodiment wherein package processing unit Z is a take-up unit configured to take up package-joining belt PC. Since the package manufacturing system according to this embodiment is similar to the foregoing package manufacturing system 200 or 210 in the structure and operation of each of package-joining belt forming unit X and scarring device 6, description of the structures and operations of these components will be omitted and description will be made of the structure and operation of each of scar forming unit Y and package processing unit Z.

Figure 7:
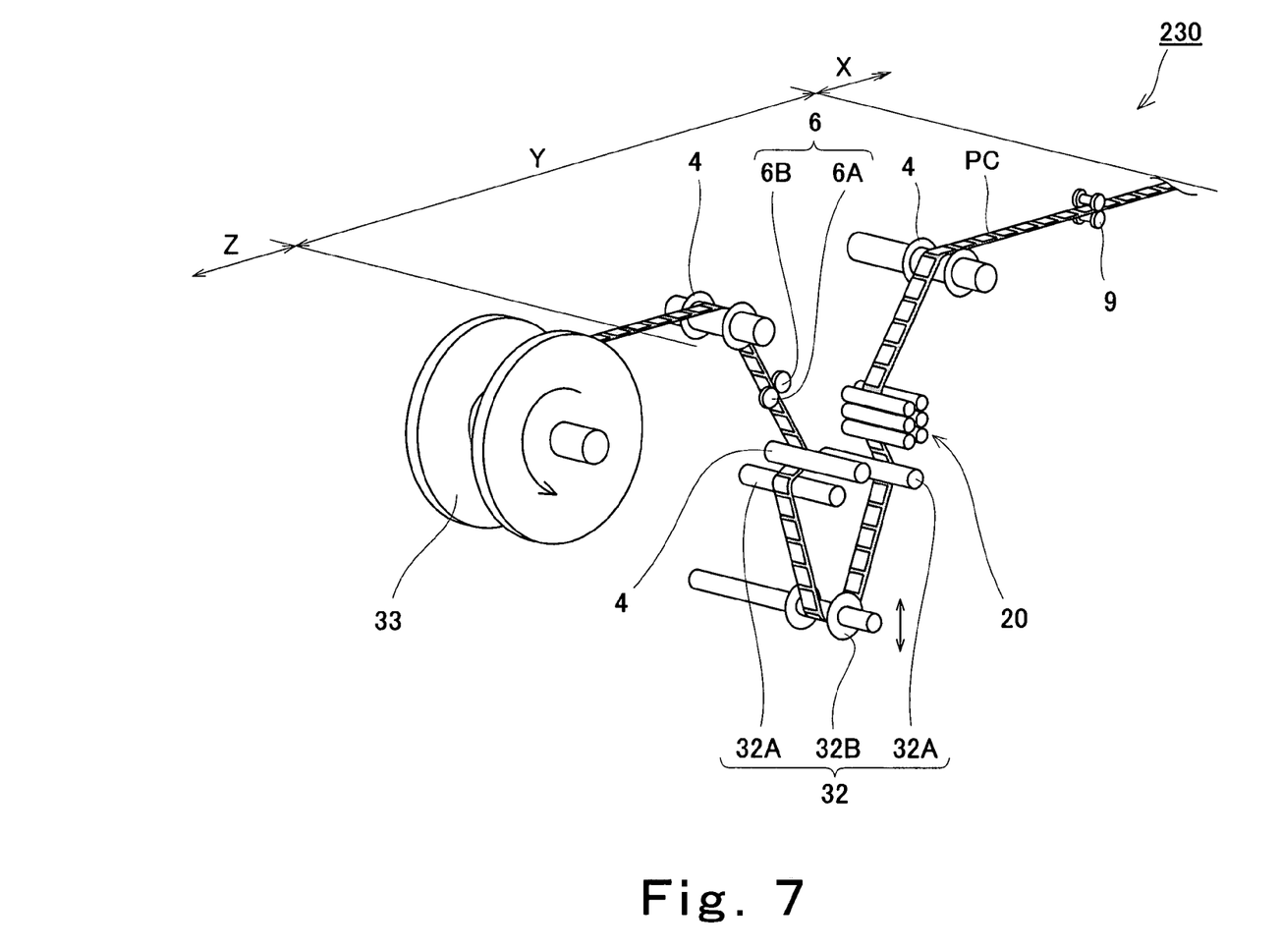
FIG. 7 is a perspective view schematically showing an arrangement of a scar forming unit and a package processing unit in a system for manufacturing a package according to embodiment 4 of the present invention.

FIG. 7 is a perspective view schematically showing an arrangement of a scar forming unit and a package processing unit in the package manufacturing system according to embodiment 4 of the present invention. Like reference characters are used to designate like or corresponding parts throughout FIGS. 1, 2A, 2B, 2C and 7 to eliminate description thereof. In FIG. 7 the package-joining belt forming unit X is not shown.

The scar forming unit Y of the package manufacturing system 230 includes feed roller 9, guide rollers 4, package detecting device 20, operation control indicator 32, and scarring device 6. The package processing unit (take-up unit) Z includes a take-up drum 33. Package-joining belt PC is positioned to pass through the scar forming unit Y and the package processing unit Z in this order.

Here, description is directed to the structure of each of the devices included in the system 230.

The feed roller 9 and the guide rollers 4 are disposed to guide package-joining belt PC to the package detecting device 20, operation control indicator 32, scarring device 6 and take-up drum 33 sequentially.

The package detecting device 20 detects passage of each package P, while a non-illustrated counter connected to the package detecting device 20 counts the number of packages P having passed through the package detecting device 20. When a predetermined number of packages P is reached, the take-up drum 33 is stopped operating by a non-illustrated controller.

The operation control indicator 32 comprises a pair of guide rollers 32A,32A and a rocking roller 32B supported intermediate the pair of guide rollers 32A,32A for rocking movement. The rocking roller 32B is configured to rock substantially perpendicularly to the direction in which the package-joining belt PC is entrained about the guide rollers 32A,32A. With this configuration, the rocking roller 32B rocks in accordance with the tension of the package-joining belt PC, thereby indicating an operation control over the take-up drum 33. More specifically, when the rocking roller 32B moves upwardly, the take-up speed of the take-up drum 33 is too high relative to the feed speed at which the package-joining belt PC is fed from the upstream side and, therefore, the take-up drum 33 need be decelerated or stopped. On the other hand, when the rocking roller 32B moves downwardly, the take-up speed of the take-up drum 33 is too low relative to the feed speed and, therefore, the take-up drum 33 need be accelerated.

The scarring device 6 comprises processing roller 6A and press roller 6B, which are located downstream of the operation control indicator 32 in the direction in which the package-joining belt PC is fed and which are rotated to feed the package-joining belt PC downstream.

The take-up drum 33 is disposed downstream of the scarring device 6 in the package-joining belt feed direction.

With reference to FIG. 7, description will be made of an example of the operation of the package manufacturing system 230. The package-joining belt PC is drawn and taken up by the take-up drum 33 in the following manner.

First, description is directed to an example of the operation of the scar forming unit Y (scar forming step). Package-joining belt PC prepared by non-illustrated package-joining belt forming unit X is guided to the package detecting device 20 by the guide rollers 4.

The package-joining belt PC having passed through the package detecting device 20 is then passed through the operation control indicator 32. Thus, the tension of the package-joining belt PC to be taken up on the take-up drum 33 is made uniform, whereby the occurrence of take-up irregularities can be suppressed.

The package-joining belt PC having passed through the operation control indicator 32 is then passed through the scarring device 6 where scars are formed on the side edge portion PF of the package-joining belt PC. Thus, each package P has become an easy-to-open package having side edge portion PF formed with plural elongate scars each extending adjacent and substantially perpendicularly to the side edge.

Next, description is directed to an example of the operation of the package processing unit Z (take-up step). The package-joining belt PC is taken up on the take-up roller 33. When the number of packages P included in the package-joining belt PC thus taken up reaches a predetermined number, the take-up drum 33 is stopped operating.

The above-described package manufacturing system 230 according to the present invention makes it possible to manufacture easy-to-open packages P each having plural elongate scars 100 formed to extend adjacent and substantially perpendicularly to the side edge in side edge portion PF with use of a scar-free film F. Hence, the package manufacturing system 230 enjoys the same advantage as the foregoing system 200 or 210. Further, the package manufacturing system 220 has an improved function, like the foregoing package manufacturing system 220.

It will be apparent from the foregoing description that many improvements and other embodiments of the present invention may occur to those skilled in the art. Therefore, the foregoing description should be construed as an illustration only and is provided for the purpose of teaching the best mode for carrying out the present invention to those skilled in the art. The details of the structure and/or the function of the present invention can be modified substantially without departing from the spirit of the present invention. For example, it is possible to construct a package manufacturing system by appropriately selecting or combining the features of the above-described package processing unit Z. The cutting device 14 of the package manufacturing system 210 may be used in the package manufacturing system 200.

Also, the scarring device 6 may be such that the processing roller 6A thereof has a circumference equal to the spacing between adjacent joint portions PA while each of the disks 6C has an outer periphery formed with cutting edges 6D not over the entire circumference thereof but over part of the circumference. Such a scarring device can form scars not all over the side edge portion PF of each package P but in a predetermined zone or section of the side edge portion PF.

Also, it is possible to provide plural feed rollers 9 on the track for guiding package-joining belt PC.

Though the package-joining belt forming unit X of each of embodiments 1 and 2 is configured to fold film F, the package-joining belt forming unit X may be configured to superpose two films F one upon the other and join them together. In this case, the package-joining belt PC has a pair of side edge portions PF along the opposite side edges thereof. For this reason, preferably, a pair of scarring devices 6 are provided to form scars on the opposite sides edge portions PF of the package-joining belt PC.

As described above, the present invention is useful as a method and system for manufacturing a package which makes it possible to reduce the cost of manufacturing easy-to-open packages, shorten the lead time for the manufacture of the easy-to-open packages, relax the restricting conditions imposed on the packaging operation due to the film having poor tensile strength, and facilitate positional adjustment of a printed surface of the film during the manufacture of the easy-to-open packages.

What is claimed is:

1. A method for manufacturing a package, comprising:
a package-joining belt forming step for forming a package-joining belt in which packages each containing a material filled in between superposed scar-free films and each sealed at joint portions and a side edge portion are joined with each other by the joint portions, the package-joining belt forming step including: a superposing process of folding one belt-shaped film widthwise or superposing two belt-shaped films one upon the other, to form superposed films; a joint portion forming process of forming band-shaped joint portions at predetermined intervals longitudinally of the superposed films, the joint portions each extending over an entire width of the superposed films and joining the superposed films together; a side edge portion forming process of forming a band-shaped side edge portion joining the superposed films together along at least one side edge of the superposed films; and a filling process of filling the material into regions defined by the joint portions and the side edge portion; and
a scar forming step for forming plural elongate scars each extending adjacent and substantially perpendicularly to said side edge in the side edge portion, wherein
the package-joining belt forming step and the scar forming step are carried out, while the package-joining belt is drawn, and
the scar forming step causes the package-joining belt to pass between a processing roller and a press roller with a portion thereof adjacent said side edge in the side edge portion being sandwiched therebetween, the processing roller comprising plural disks each having plural cutting edges extending substantially in a thickness direction thereof and formed over an entire circumference thereof, the plural disks being stacked in a manner that the cutting edges of one disk are spaced apart from those of an adjacent disk, the press roller having a smooth peripheral surface, the processing roller and the press roller being positioned in a manner that the cutting edges of the processing roller are allowed to come into substantial contact with the peripheral surface of the press roller.

2. The method according to claim 1, further comprising any one of steps including: a perforating step for forming perforations in the joint portions; a cutting step for cutting off each of the packages from the package-joining belt; a folding step for folding the package-joining belt to a predetermined length; and a take-up step for taking up the package-joining belt into a roll.

3. A system for manufacturing a package comprising: a package-joining belt forming means for forming a package-joining belt in which packages each containing a material filled in between superposed scar-free films and each sealed at joint portions and a side edge portion are joined with each other by the joint portions, by a package-joining belt forming step including: a superposing process of folding one belt-shaped film widthwise or superposing two belt-shaped films one upon the other, to form superposed films; a joint portion forming process of forming band-shaped joint portions at predetermined intervals longitudinally of the superposed films, the joint portions each extending over an entire width of the superposed films and joining the superposed films together; a side edge portion forming process of forming a band-shaped side edge portion joining the superposed films together along at least one side edge of the superposed films; and a filling process of filling the material into regions defined by the joint portions and the side edge portion; and     a scar forming means for forming plural elongate scars each extending adjacent and substantially perpendicularly to said side edge in the side edge portion, wherein the package-joining belt forming means and the scar forming means are driven, while the package-joining belt is drawn, and the scar forming means causes the package-joining belt to pass between a processing roller and a press roller with a portion thereof adjacent said side edge in the side edge portion being sandwiched therebetween, the processing roller comprising plural disks each having plural cutting edges extending substantially in a thickness direction thereof and formed over an entire circumference thereof, the plural disks being stacked in a manner that the cutting edges of one disk are spaced apart from those of an adjacent disk, the press roller having a smooth peripheral surface, the processing roller and the press roller being positioned in a manner that the cutting edges of the processing roller are allowed to come into substantial contact with the peripheral surface of the press roller.

4. The system according to claim 3, further comprising any one of means including: a perforating means for forming perforations in the joint portions; a cutting means for cutting off each of the packages from the package-joining belt; a folding means for folding the package-joining belt to a predetermined length; and a take-up means for taking up the package-joining belt into a roll.

* * * * *